United States Patent [19]

Akazawa et al.

[11] 4,069,300

[45] Jan. 17, 1978

[54] PROCESS FOR PRODUCING α-TYPE CALCIUM SULFATE HEMIHYDRATE

[75] Inventors: Hakuichi Akazawa; Kenichi Nishimura, both of Kakogawa, Japan

[73] Assignee: Taki Chemical Co., Ltd., Kakogawa, Japan

[21] Appl. No.: 616,312

[22] Filed: Sept. 24, 1975

[30] Foreign Application Priority Data

Oct. 3, 1974 Japan .................................. 49-115006

[51] Int. Cl.$^2$ ....................... C01F 11/46; C04B 11/02
[52] U.S. Cl. ..................................... 423/555; 106/110; 423/166; 423/171
[58] Field of Search ............... 423/161, 160, 170, 171, 423/172, 266, 554, 555, 242; 106/109, 110

[56] References Cited

U.S. PATENT DOCUMENTS

| Re. 21,631 | 11/1940 | Johnstone | 423/555 |
|---|---|---|---|
| 2,044,942 | 6/1936 | Heckert | 423/555 |
| 2,086,379 | 7/1937 | Clark | 423/555 |
| 3,410,655 | 11/1968 | Ruter | 423/555 |
| 3,808,321 | 4/1974 | Fukui et al. | 423/166 |
| 3,904,742 | 9/1975 | Akimoto | 423/554 |

*Primary Examiner*—O. R. Vertiz
*Assistant Examiner*—Gary P. Straub
*Attorney, Agent, or Firm*—Armstrong, Nikaido & Marmelstein

[57] ABSTRACT

A process for producing α-type hemihydrate calcium sulfate by oxidizing calcium sulfite with an oxidizing agent in a suspension containing at least one anionic, nonionic or amphoteric surface active agent.

5 Claims, No Drawings

PROCESS FOR PRODUCING α-TYPE CALCIUM SULFATE HEMIHYDRATE

This invention relates to a process for producing α-type calcium sulfate hemihydrate by oxidizing calcium sulfite in an aqueous suspension in the presence of a surface active agent.

In recent years, gases containing $SO_2$ are discharged in quantitites out of various plants into the atmosphere, causing pollution. Therefore, various methods for removing such $SO_2$ are being investigated. For example, a process is suggested to produce calcium dihydrate by adding $SO_2$ and air with a slaked lime slurry to a calcium salt solution containing an oxidizing agent and a crystal growth controlling agent or a surface active agent (Japanese Patent Kokai No. 63694/1974). However, this process requires a large amount of soluble calcium salt to yield calcium sulfate dihydrate and is therefore uneconomical.

Practiced today is a process for producing calcium sulfate dihydrate by making a waste gas containing $SO_2$ react with a slaked lime slurry to produce calcium sulfite first and then oxidizing it. The hardest problem of this process, however, is the low rate of oxidizing reaction and how to raise it.

When dihydrated calcium sulfate is produced from calcium sulfite, the oxidation will take place at a relatively low temperature (below about 80° C.) and will proceed at a velocity practicable but not very satisfactory. Therefore, an improved process is suggested wherein calcium sulfite is oxidized in the presence of cobalt ions or manganese ions (Japanese Patent Publication No. 12005/70).

On the other hand, in the case of producing α-type hemihydrate of calcium sulfate by oxidizing calcium sulfite, there will be much more difficulty, because α-type hemihydrate of calcium sulfate will be produced only in a high temperature range and the oxidizing reaction will have to be carried out in that high temperature range where the amount of oxygen present as dissolved in the suspension will be extremely small and the rate of oxidation will notably be reduced.

Thus only one process is known to date for producing α-type hemihydrate of calcium sulfate, wherein a suspension of calcium sulfate dihydrate is treated under pressure in an autoclave (Japanese Patent Kokai No. 87592/1974). In this process, however, the produced crystals of α-type hemihydrate are so fine that the suspension or slurry is of high viscosity making uniform agitation and filtration difficult.

Such situation led the present inventors to concentrate on developing a new process for producing α-type hemihydrate of calcium sulfate in coarse grainy crystals which can give a low suspension viscosity. As a result, a method was discovered to greatly increase the rate of oxidation and to obtain the desired crystal characteristics. Thus the present invention was completed.

To put it briefly, the present invention relates to a process for producing α-type hemihydrate of calcium sulfate by oxidizing calcium sulfite in a suspension in the presence of a surface active agent.

One object of the present invention is to realize a high oxidation velocity of calcium sulfite in an industrially feasible way.

Another object of the invention is to obtain coarse grainy crystals of α-type hemihydrate of calcium sulfate.

Still another object is to produce α-type hemihydrate of calcium sulfate in a relatively low temperature range.

Other objects of the present invention will become clear in the following explanation.

Now, the present invention shall be described more particularly. First of all, a suspension of calcium sulfite is prepared by dispersing calcium sulfite ($CaSO_3 \cdot 1/2H_2O$) in water. The proper concentration, or solid content, of this calcium sulfite suspension is 5 to 30% by weight, or preferably 10 to 20% by weight. Generally, if it is lower than that 5% by weight, the volume of the suspension will be large and the production efficiency will be reduced. If it is higher than 30% by weight, the viscosity of the suspension will be high; the oxidation velocity will be low; and the crystals obtained will not be coarse enough.

In the present invention such calcium sulfite in the suspension is oxidized in the presence of a surface active agent. The pH of the calcium sulfite suspension at the time of the oxidation is generally less than 6, or preferably 4.0 to 5.0.

With the progress of the oxidation of calcium sulfite, the pH will gradually rise and the oxidizing velocity will gradually be reduced. Therefore, it is necessary to keep the pH of the suspension within the above-mentioned range during the oxidizing reaction. The acid to be used for such pH adjustment may be either an inorganic acid or an organic acid, but the pH adjusting agent recommended most by the present inventors is sulfuric or sulfurous acid, because, if there is unconverted $Ca(OH)_2$ or $CaCO_3$ remaining in the calcium sulfite used, as is often the case with one obtained by the reaction of $SO_2$ in a flue-gas with a lime slurry, it can not be converted to sulfate in the absence of sulfuric or sulfurous acid and will simply contaminate the α-type hemihydrate of calcium sulfate produced. When sulfuric or sulfurous acid is used as a pH adjusting agent, $Ca(OH)_2$ or $CaCO_3$ in calcium sulfite will all be converted to α-type hemihydrate of calcium sulfate. The use of sulfurous acid is more advantageous, since a waste gas containing $SO_2$ can be utilized. This is of great significance from an industrial viewpoint. That is to say, $SO_2$ in the waste gas can be removed at the time of converting calcium sulfite and at the time of adjusting the pH.

EXPERIMENT 1

A 5-mounted separable flask of a capacity of 2 liters was set on a mantel-heater; an air inlet pipe, a $SO_2$ inlet pipe, a condenser, an agitator and a thermometer were installed on the flask; 500 g. of water, 63 g. of calcium sulfite, 5 g. of seed crystals of α-type hemihydrate of calcium sulfate and 500 mg. of sodium alkylbenzenesulfonate (which shall be abbreviated as SABS hereinafter) were put into the flask; air was continuously introduced into it at a rate of 200 liters/hour. The percent conversion of calcium sulfite into α-type hemihydrate of calcium sulfate in 10 hours was measured. The reaction temperature was 95° C., and the pH was adjusted with sulfurous acid.

Table 1

| Influences of pH | |
|---|---|
| Reaction mixture pH | Percent conversion |
| 6 to 7 | 6.1 |
| 5 to 6 | 63.2 |
| 4 to 5 | 75.0 |
| 3 to 4 | 54.8 |

As evident from this table, when the pH is above 6, the rate of oxidizing reaction will remarkably be reduced.

The surface active agent to be used in the present invention is an anionic, nonionic or amphoteric one. With a cationic surface active agent, the effect of the present invention can never be expected.

As surface active agents for the present invention, there can be enumerated an anionic surface active agent having a sulfonic acid group as the hydrophilic atomic group and having an alkyl, alkyl-aryl or alkylallyl group as the hydrophobic atomic group, a nonionic surface active agent having a polyoxyethylene chain as the hydrophilic atomic group and having an alkyl or alkylphenoxy group as the hydrophobic atomic group and an amphoteric surface active agent of a betaine type. They can be used as combined. Their examples are an alkylsulfonic acid or its salt, alkylbenzenesulfonic acid or its salt, α-olefinsulfonate, alkylnaphthalenesulfonate, polyoxyethylene alkyl ether, alkylbetaine and polyoxyethylene alkylphenol ether.

Particularly preferable is an anionic surface active agent, above all, an alkyl-arylsulfonic acid or its alkali metal salt. (Most typically sodium dodecylbenzenesulfonate.)

Such surface active agent has only to be present in the oxidizing stage of calcium sulfite and therefore may be added to water before suspending calcium sulfite or to the suspension of calcium sulfite.

The amount of the surface active agent to be used is somewhat different depending on its kind, reaction temperature and the amount of the seed crystals but, on the whole, 0.2 to 5% by weight or preferably 0.5 to 3% by weight on calcium sulfite. When it is below 0.2% by weight, the objects of the present invention will not be realized. Even if it is used by more than 5% by weight, not only its economy will be impaired but also no additional effect of the increment will be expected.

In oxidizing calcium sulfite in the suspension in the presence of a surface active agent, it is necessary to keep the temperature of the reaction mixture, or suspension, within a range in which α-type hemihydrate of calcium sulfate can be produced. In the present invention, such temperature range is relatively wide, permitting easier control of reaction.

In case no surface active agent is present, it will be necessary to keep the suspension temperature above 97° C., but in the present invention, α-type hemihydrate can be produced even at a temperature as low as 90° C. It had never been anticipated before the present invention that α-type hemihydrate can be produced at such a low temperature. This means a significant industrial merit. Its advantages are, first, that heat can be economized; second, that no autoclave has to be used; and, third, that the lower the temperature, the coarser the produced crystals.

Under the present invention, therefore, the reaction can be conducted in a wider temperature range than that for the known process, namely temperature higher than 90° C. instead of 97° C.

From a practical point of view, however, it would be preferable to carry out the reaction within a temperature range of 95° to 105° C. The temperature control will be more difficult in the range of 90° to 95° C. with the need for very precise control to avoid the risk of temperature getting lower than 90° C. by chance.

Exercise of the present invention at a temperature higher than 105° C. is also possible but with less merit, since in that case an expensive reaction vessel like an autoclave is usually required. In addition, when the suspension temperature is higher than 130° C., the effect of surface active agent will be minimized and the merits of the present invention will be lost.

Now the influences of the surface active agent are more specifically shown as follows.

EXPERIMENT 2

500 g. of water, 63 g. of calcium sulfite, 27 g. of seed crystals of α-type hemihydrate of calcium sulfate and a fixed amount of SABS were added into the apparatus of Experiment 1, and the species of calcium sulfate produced at different reaction temperatures were determined. The results are shown in Table 2.

Other reaction conditions were as follows:
1. Air feed rate: 200 liters/hour
2. $SO_2$ feed rate: 4 liters/hour
3. Reaction pH: 4 to 5

Table 2

| Reaction temperature (° C.) | Kinds of produced calcium sulfate | | | Without SABS |
|---|---|---|---|---|
| | Amount of SABS (mg.) | | | |
| | 200 | 300 | 500 | |
| 100 | α-type hemihydrate | α-type hemihydrate | α-type hemihydrate | α-type hemihydrate and dihydrate |
| 95 | Dihydrate | " | " | Dihydrate |
| 90 | " | Dihydrate | " | " |
| 85 | " | " | α-type hemihydrate and dihydrate | " |
| 80 | " | " | Dihydrate | " |

As evident from the above table, in case no SABS is present, dihydrate will be partly produced even at 100° C. According to the present invention, on the other hand, α-type hemihydrate can be made at a temperature as low as 90° C.

Now, the influences of the surface active agent on the reaction velocity which is one object of the present invention and the sizes of the crystals are concretely shown as follows.

EXPERIMENT 3

600 g. of a calcium sulfite suspension ($CaSO_3$ 12.5% by weight), 25 g. of α-type hemihydrate seed crystals of calcium sulfate and 500 mg. of SABS were put in the apparatus used in Experiment 1. Into this mixture were introduced air and the percent conversion of the calcium sulfite into calcium sulfate α-type hemihydrate and the crystal size of the latter were measured.

The same procedures were followed with a control mixture which was different from the foregoing only in that it contained no SABS.

The following reaction conditions were used:

| | |
|---|---|
| (1) Reaction temperature | 103° C. |
| (2) Air feed rate | 200 liters/hour |
| (3) $SO_2$ feed rate | 4 liters/hour |
| (4) Reaction pH | 4 to 5 |

The results are given in Table 3.

Table 3

| Reaction time (hour) | Percent conversion and crystal size | | | |
|---|---|---|---|---|
| | with SABS (present invention) | | without SABS (control) | |
| | Percent conversion | Mean crystal size (μ) | Percent conversion | Mean crystal size (μ) |
| 1 | 16.1 | under " | 4.3 | under 3 × 3 |
| 2 | 34.1 | " | 9.5 | " |
| 3 | 46.5 | 7 × 10 | 12.0 | " |
| 4 | 56.0 | 12 × 16 | 16.4 | " |
| 5 | 69.7 | 19 × 18 | 21.2 | " |
| 6 | 90.2 | 20 × 20 | 26.2 | " |

As evident from the above table, when a surface active agent is used, the rate of oxidation gets remarkably greater than otherwise.

In the present invention, no less important than using a surface active agent is the use of α-type hemihydrate of calcium sulfate as seed crystals. It is often practiced in a chemical operation to use seed crystals to coarsen crystals. However, the present inventors have confirmed that, when a surface active aent and seed crystals are used together, not only the crystals will be coarsened but also the rate of oxidation will be remarkably elevated. The effects are shown as follows.

EXPERIMENT 4

500 g. of water and 63 g. of calcium sulfite were put into the apparatus of Experiment 1, and under agitation SABS and seed crystals of α-type calcium sulfate hemihydrate were added. The percent conversion of calcium sulfite into α-type hemihydrate of calcium sulfate in 6 hours was measured.

The results were as in Table 4.

Reaction conditions:

| (1) Air feed rate | 200 liters/hour |
|---|---|
| (2) SO₂ feed rate | 4 liters/hour |
| (3) Reaction temperature | 103° C. |
| (4) Reaction pH | 4 to 5 |

Table 4

| Amount of seed (g.) | Influences of seed crystals | |
|---|---|---|
| | Percent conversion | |
| | SABS 500 mg. | SABS 700 mg. |
| 0 | 38.9 % | 35.9 % |
| 5 | 43.8 | 36.6 |
| 15 | 61.5 | 46.7 |
| 25 | 90.2 | 59.7 |
| 35 | 64.5 | 73.8 |
| 45 | 52.9 | 98.1 |
| 55 | 49.2 | 75.6 |

As evident from the above table, when seed crystals are present, and optimum conditions are selected, the reaction velocity will become more than double. Further, as seen also in the above table, there is an optimum range of the usable amount of seed crystals depending on the amount of SABS used, and it is desirable to use a larger amount of seed crystals with the increase of the amount of SABS. The proper amount of seed crystals is generally 10 to 150 times or preferably 25 to 100 times the weight of the surface active agent used. Part of α-type calcium sulfate hemihydrate produced by the oxidization of calcium sulfite may be recycled for use as such seed crystals. The size of seed crystals considered most preferable is 5 to 25 microns. Such seed crystals can be obtained by subjecting α-type hemihydrate of calcium sulfate to an ordinary classifying means.

This kind of calcium sulfate is not different from ordinary seed crystals in the using manner and may be added to calcium sulfite or to a suspension of calcium sulfite.

When calcium sulfite is subjected to the process of the present invention under properly selected conditions, it will be converted almost completely to α-type hemihydrate of calcium sulfate in 3 to 4 hours, giving coarse grain crystals.

For an oxidizing agent in the present invention, air is most economical but oxygen may be also used. Air may be fed in response to the amount of calcium sulfite.

The process of the present invention can be carried out either by a batch operation or continuously. In the case of continuous operation, several oxidizing reactors are connected; a classifier and filter are provided next to the final oxidizing reactor; and seed crystals of a size in the above mentioned range is taken out of the classifier and sent back to the first oxidizing reactor. When a calcium sulfite suspension produced by absorbing a waste gas containing SO₂ with a slaked lime slurry is to be used as a raw material, it will be able to be utilized as it is without adding water further, because the concentration of calcium sulfite in such suspension will be generaly 10 to 12% by weight. Therefore, the most desirable method of working the present invention is to integrate the process into an SO₂ absorbing unit.

The present invention shall be further explained with examples in the following examples.

EXAMPLE 1

500 g. of water, 63 g. of calcium sulfite and 300 mg. of SABS were added into the apparatus of Experiment 1. The percent conversion of calcium sulfite into α-type hemihydrate of calcium sulfate in 10 hours was 83.

Other reaction conditons were as follows:

| (1) Air feed rate | 200 liters/hour |
|---|---|
| (2) SO₂ feed rate | 4 liters/hour |
| (3) Reaction pH | 4 to 5 |
| (4) Reaction temperature | 103° C. |

EXAMPLE 2

600 g. of a calcium sulfite suspension (solid content 15% by weight), 5 g. of seed crystals of α-type calcium sulfate hemihydrate and a surface active agent were put into the apparatus of Experiment 1, air and sulfur dioxide were blown into it, and the percent conversion of calcium sulfite into α-type hemihydrate of calcium sulfate in 10 hours was measured. The results were as in Table 5.

Reaction conditions:

| (1) Air feed rate | 250 liters/hour |
|---|---|
| (2) SO₂ feed rate | 4 liters/hour |
| (3) Reaction temperature | 100° C. |
| (4) Reaction pH | 4 to 5 |
| (5) Surface active agent used | 300 mg. |

Table 5

| Kinds of surface active agent | Percent conversion |
|---|---|
| SABS | 97 |
| Sodium alkylnaphthalenesulfonate | 85 |
| Polyoxyethylene nonyl ether | 76 |

Table 5-continued

| Kinds of surface active agent | Percent conversion |
| --- | --- |
| Sodium α-olefinsulfonate | 79 |
| Dimethyl alkylbetaine (alkyl group being derived from coconut oil) | 95 |

EXAMPLE 3

600 g. of a calcium sulfite suspension (solid content 12.5% by weight), 5 g. of seed crystals of α-type calcium sulfate hemihydrate and SABS were added into the apparatus of Experiment 1; and the percent conversion of calcium sulfite into a α-type hemihydrate of calcium sulfate in 10 hours was measured. The results were as in Table 6.

| (1) Air feed rate | 200 liters/hour |
| --- | --- |
| (2) SO$_2$ feed rate | 4 liters/hour |
| (3) Reaction temperature | 95° C. |
| (4) Reaction pH | 4 to 5 |

Table 6

| Amount of SABS (mg.) | Percent conversion |
| --- | --- |
| 200 | 83 |
| 300 | 94 |
| 500 | 73 |
| 700 | 61 |
| 1500 | 60 |

EXAMPLE 4

600 g. of a calcium sulfite suspension (solid content 12.5% by weight), 5 g. of seed crystals of α-type calcium sulfate hemihydrate and a surface active agent were added into the apparatus of Experiment 1 and the percent conversion of calcium sulfite into α-type hemihydrate of calcium sulfate in a fixed reaction time was measured. The results were as in Table 7.

Reaction conditions:

| (1) Air feed rate | 200 liters/hour |
| --- | --- |
| (2) SO$_2$ feed rate | 4 liters/hour |
| (3) Reaction temperature | 100° C. |
| (4) Reaction pH | 4 to 5 |

Table 7

| Reaction time (hours) | Percent conversion | | |
| --- | --- | --- | --- |
| | 350 mg. of SABS (A) | 350 mg. of polyoxyethylene nonyl ether (B) | 300 mg. of (A) + 50 mg. of (B) |
| 4 | 36 | 29 | 41 |
| 6 | 52 | 47 | 69 |
| 8 | 73 | 65 | 91 |

This represents a typical example where two surface active agents used at a time can work synergetically in raising the oxidizing reaction velocity, or percent conversion.

EXAMPLE 5

A cylindrical reactor of a diameter of 110 mm. and height of 1300 mm. provided with a rotary atomizer (manufactured by Ides Company, Ltc.) to increase the air-liquid contact surface was set on a mantel heater. Into the reactor were added 2840 g. of a calcium sulfite suspension (solid content 12% by weight), 135 g. of seed crystals of α-type calcium sulfate hemihydrate and 2.5 g. of a surface active agent in the following table. Then air and sulfur dioxide were blown into it and the percent conversion of calcium sulfite into α-type hemihydrate of calcium sulfate in 3 hours and the efficiency in terms of air utilization of air were measured.

Reaction conditions:

| (1) Air feed rate | 80 liters/hour |
| --- | --- |
| (2) SO$_2$ feed rate | 3 liters/hour |
| (3) Reaction temperature | 95° C. |
| (4) Reaction pH | 4 to 5 |
| (5) Atomizer rotation | 400 r.p.m. |

Table 8

| Kinds of surface active agent | Percent conversion | Percent air-utilization rate (%) |
| --- | --- | --- |
| SABS | 98.7 | 62.5 |
| Alkylbenzenesulfonic acid | 97.5 | 60.3 |

EXAMPLE 6

2840 g. of a calcium sulfite suspension (solid content 30% by weight), 135 g. of seed crystals of α-type calcium sulfate hemihydrate and 2.0 g. of SABS were added into an autoclave apparatus having the same structure as in Example 5. The pressure in the apparatus was adjusted tp be 2 to 3 kg./cm$^2$/ Sulfuric acid was used as a pH adjusting agent and compressed air was blown into the apparatus to produce α-type hemihydrate of calcium sulfate. As a result, the percent conversion of calcium sulfite into α-type calcium sulfate hemihydrate in 3 hours was 97.4% and the percent utilization of air was 68.5%.

Reaction conditions:

| (1) Air feed rate | 80 liters/hour |
| --- | --- |
| (2) Reaction temperature | 110° C. |
| (3) Reaction pH | 4 to 5 |
| (4) Atomizer rotation | 400 r.p.m. |

What is claimed is:

1. A process for producing α-type hemihydrate of calcium sulfate by oxidizing calcium sulfite with air or oxygen at a temperature in the range of from 90° C to 130° C in a suspension containing surface active agents, the suspension containing seed crystals of α-type hemihydrate of calcium sulfate and having a pH in the range of from 3 to 6 and the surface active agents being at least one agent selected from the group consisting of (a) anionic surface active agents having a sulfonic acid group as the hydrophilic atomic group and having an alkyl, alkyl-aryl or alkylallyl group as the hydrophobic atomic group; (b) non-ionic surface active agents having a polyoxyethylene chain as the hydrophilic atomic group and having an alkyl or alkylphenoxy group as the hydrophobic atomic group and (c) amphoteric surface active agents of a betaine.

2. The process of claim 1 wherein the surface active agents are at least one agent selected from the group consisting of alkylsulfonic acids and salts thereof, alkylbenzenesulfonic acids and salts thereof, α-olefinsulfonate, alkylnaphalenesulfonate, polyoxyethylene alkyl ether, alkylbetaine and polyoxyethylene alkylphenol ether.

3. A process according to claim 1 wherein the amount of said surface active agent is 0.2 to 5% by weight on calcium sulfite.

4. A process according to claim 1 wherein the concentration of calcium sulfite in the suspension is 5 to 30% by weight.

5. A process according to claim 1 wherein the pH adjusting agent is sulfuric acid or sulfurous acid.

* * * * *